Oct. 9, 1962 R. K. LEARMONT 3,057,284
MOVABLE INSULATING PANEL FOR A STORAGE UNIT
Filed Nov. 16, 1959

INVENTOR.
ROBERT K. LEARMONT
BY
Andrus & Starke
Attorneys

United States Patent Office 3,057,284
Patented Oct. 9, 1962

3,057,284
MOVABLE INSULATING PANEL FOR A
STORAGE UNIT
Robert K. Learmont, Hales Corners, Wis., assignor, by direct and mesne assignments, of one-half to Robert K. Learmont, Hales Corners, Wis., and one-half to C. J. Williams, River Hills, Wis.
Filed Nov. 16, 1959, Ser. No. 853,215
13 Claims. (Cl. 98—6)

This inventoin relates to a partition or panel for a storage structure and more particularly to a panel for use in a vehicle or trailer to divide the trailer into a plurality of compartments.

In the trucking industry, it is often desirable to divide a trailer into one or more compartments when hauling various materials in one load. In the food industry, for example, different types of food products, such as frozen foods, produce and canned or packaged goods, are frequently hauled in a single trailer and it is necessary to maintain these materials at different temperatures. Insulated panels are frequently used to divide the trailer into a series of compartments, with each compartment being maintained at the desired temperature.

The present invention is directed to an improved insulated panel construction for a trailer or other storage unit which can be readily moved and positioned within the trailer to divide the trailer into separate compartments or storage areas and provides an effective thermal seal between the various compartments.

According to the invention, the panel is formed with a lightweight cellular core covered with metal facings or skins. The edges of the panel are reinforced by channel members and a resilient strip or flap is secured between each flange of the channel member and the corresponding facing to thereby prevent metal-to-metal contact transversely through the panel. The pair of resilient flaps extending outwardly from each edge of the panel into sealing engagement with the walls of the trailer provide an effective thermal seal between the various compartments.

To move the panel longitudinally within the trailer, a pair of rollers are secured to the upper portion of the side edges of the panel and are adapted to ride on a track which is recessed in the side wall of the trailer. With this construction, the panel can be readily moved longitudinally within the trailer to vary the size of the compartments, as desired. The panel is locked at any desired location by means of slide bolts which engage suitable openings in the bottom portion of the side wall of the trailer.

If the partition is not required for a particular load, the entire partition can be pivoted upwardly and locked against the ceiling of the trailer to provide a substantially unobstructed area for loading.

The partition or panel of the present invention is movable within the trailer and can be locked in any one of a number of locations to vary the size of compartments, as desired. By merely tilting the panel upwardly and locking it against the ceiling, the panel can, in effect, be removed to provide a single loading compartment in the trailer.

As the track on which the panel rides is recessed within the side walls, the track will not interfere with the loading operation and the entire weight of the panel is thereby supported on the side walls.

The pair of rubber flaps or strips, which extend outwardly from each edge of the panel, are spaced apart to provide a dead air chamber which increases the insulating effect between the various compartments.

Other objects and advantages will appear in the course of the following description.

The drawings illustrate the best mode presently contemplated of carrying out the invention.

In the drawings:
FIGURE 1 is a side elevation of a tractor and trailer with the trailer incorporating the panel construction of the invention;

Figure 1:
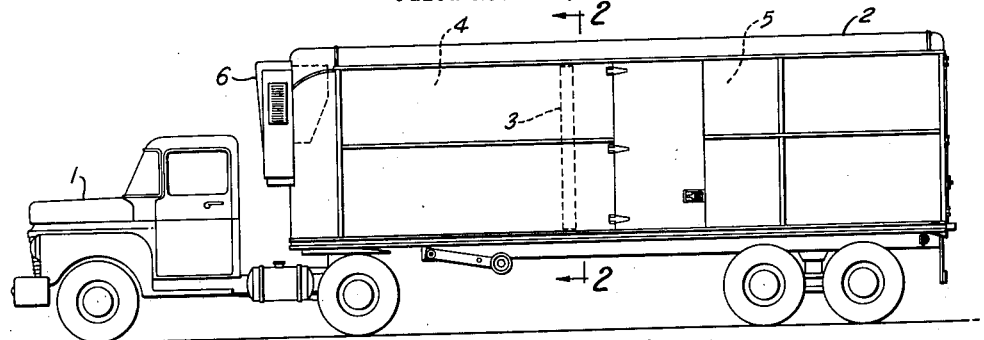

The drawings illustrate a tractor 1 which is connected to and hauls a trailer 2. A panel 3 is disposed transversely within the trailer 2 and divides the trailer into a forward compartment 4 and a rear compartment 5. A conventional refrigeration unit 6 is located in the forward wall of the trailer and serves to cool or refrigerate the materials contained within the compartment 4. The panel 3 is adapted to be moved longitudinally within the trailer 2 to thereby vary the size of the compartments 4 and 5, as desired. The panel serves to insulate or seal the compartments 4 and 5 so that products requiring different temperatures can be stored in the respective compartments.

Figures 2, 4:
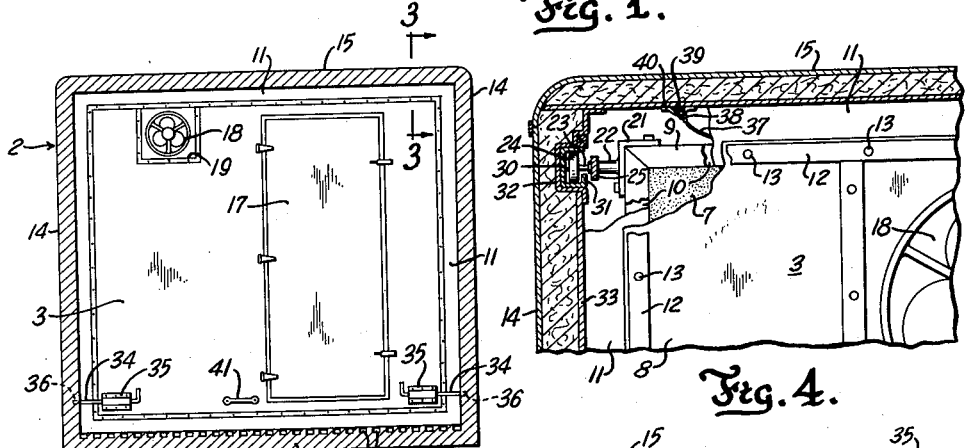
FIG. 2 is a transverse section taken through the trailer showing the panel structure in elevation.
FIG. 4 is a transverse section taken through the wall of the trailer and taken along line 4—4 of FIG. 3.
Figure 3:
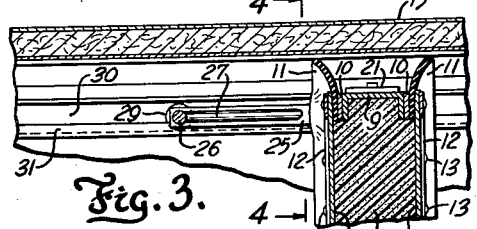
FIG. 3 is an enlarged sectional view, taken along line 3—3 of FIG. 2.
Figure 5:
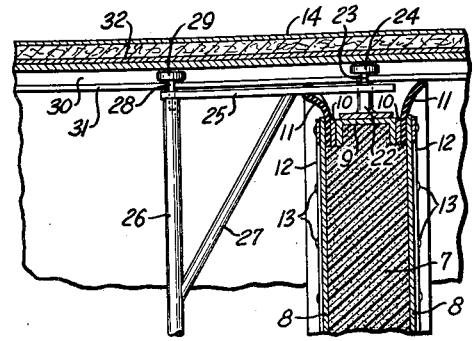
FIG. 5 is a fragmentary horizontal section taken through the panel and showing the rollers located within the track.

As best shown in FIGS. 3 through 5, the panel 3 is composed of a central lightwight core 7 which is formed of a cellular material, such as foam plastic or the like. The core 7 is provided with a pair of outer skins or facings 8 which are preferably formed of a lightweight metal, such as aluminum or stainless steel.

As shown in FIGS. 3 and 5, the edges of the panel are enclosed by a channel 9 which extends completely around the panel and provides strength and rigidity for the panel.

To prevent metal-to-metal contact between the channel 9 and the facings 8 and thereby reduce the heat transfer through the panel, plastic strips 10 and resilient flaps 11 are disposed between the outer surfaces of the flanges of the channel 9 and the respective facings.

The space between the edges of the panel 3 and the respective wall surfaces of the trailer 2 is sealed by the pair of resilient flaps or strips, made of rubber or the like, which extend outwardly from the panel and into engagement with the trailer walls. The flaps 11 and plastic strips 10 are secured to the channels 9 by means of molding strips 12 and screws 13.

The rubber flaps 11 are provided with a width substantially greater than the space between the edges of the panel and the wall of the trailer so that the flaps, in operation, will be bent outwardly and provide a positive seal between the trailer walls and the panel.

As best shown in FIG. 2, the rubber flaps 11 extend completely around the panel and are disposed in sealing engagement with the side walls 14, ceiling 15 and floor 16 of the trailer. The use of the two rubber flaps for each edge of the panel provides a dead air space between the flaps to improve the insulating effect and thereby decreases the rate of heat transfer around the panel edges.

To provide access between the compartments 4 and 5, the panel is provided with an insulated door 17 which, when closed, is sealed to the panel edges to provide an insulating seal between the compartments.

In cases where it is desired to have the refrigerated air from the refrigerator unit 6 also be conducted to the rear compartment 5, a fan 18 is disposed within a suitable opening 19 in the panel. The fan is adapted to blow air from the compartment 4 into the compartment 5 and the spaces 20 between the corrugations in the floor 16 serve as return passages for the air and provide a continuous circulation of air between the compartments 4 and 5. In this case, the compartment 4 will be at the lowest temperature and could, for example, contain frozen food or ice cream, while the rear compartment 5, which will be at a slightly elevated temperature, could be used for produce or other materials requiring a cool temperature.

The panel 3 is adapted to be moved longitudinally within the trailer to vary the size of the compartments 4 and 5. To provide mobility for the panel, a bracket 21 is secured to each upper corner of the panel by suitable screws. Each bracket 21 carries a bearing 22 which extends outwardly toward the respective side wall 14 and the shaft 23 of a roller 24 is rotatably disposed within the bearing 22.

The bearing 22 is journaled within an opening in a bar 25 which extends longitudinally of the trailer and the ends of the bar 25 are connected by a cross tube 26. A suitable brace 27 is disposed between the bar 25 and the cross tube 26 to reinforce the members.

The shaft 28 of a roller 29 is disposed within each end of the cross tube 26 and the rollers 24 and 29 are adapted to ride in a horizontal track 30 which is recessed within each side wall 14 of the trailer.

As best shown in FIG. 4, the track 30 is provided with an upstanding lip 31 which prevents lateral displacement of the rollers 24 and 29. The track, itself, is disposed within a recess in the respective side wall.

To prevent condensation and other moisture from leaking behind the track and entering the side wall of the trailer, a flashing member 32, as shown in FIG. 4, is secured to the ceiling 15 and extends downwardly and behind the track 30, and then downwardly over the inner plywood facing 33 of the side wall 14. Any moisture condensing on the flashing 32 or on the track 30 will flow downwardly over the lower end of the flashing rather than getting behind the facing 33.

The panel is locked in any desired position within the trailer by means of a pair of slide bolts 34 which are slidably disposed in brackets 35. The outer ends of the slide bolts are adapted to be received within a series of holes 36 formed in the side walls 14 of the trailer.

As the panel is adapted to be moved within the trailer, a sliding electrical connection for the fan is provided. The electrical lead 37 connected to the fan is provided with an alligator clip 38 which is adapted to be secured to a conductor rod 39 which extends longitudinally of the trailer and is secured to the trailing ceiling 15 by brackets 40.

Before moving the panel 3, the clips 38 are disengaged from the rod 39. The panel can then be moved longitudinally and when in the proper position, the clips 38 are again re-engaged with the rod to complete the electrical connection to the fan. The conductor 39 is connected by suitable leads, not shown, to the electrical system of the tractor 1.

Figure 6:
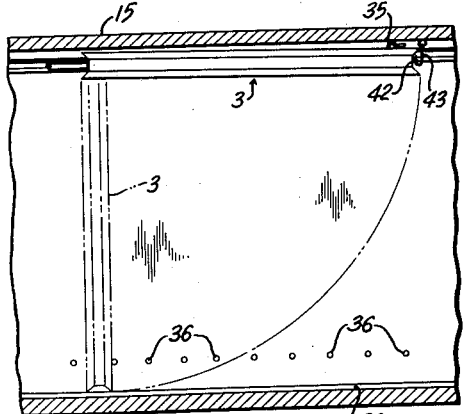
FIG. 6 is a vertical sectoin taken through the trailer and showing the panel is the upper locked position.

When it is desired not to use the panel 3, the panel can be pivoted upwardly and locked against the ceiling 15 of the trailer. In this regard, the panel is provided with a handle 41 and by pulling upwardly on the handle, the panel will pivot about the axis of wheel shaft 23 with the bearing 22 rotating within the opening in bar 25. A series of loops 42 are provided on the bottom channel 9 of the panel and when in the raised position, the loops are adapted to be engaged on hooks 43 depending from the ceiling. As best shown in FIG. 6, the panel can be pivoted to a position approximately flush with the ceiling to thereby provide a substantially unobstructed loading area extending throughout the entire trailer.

The present invention provides an improved panel construction which provides an effective insulating seal between compartments in the trailer. The panel can be readily moved lengthwise within the trailer, and by use of the pair of wheels associated with each edge of the trailer, a positive, smooth movement is provided which will eliminate the possibility of the wheels jamming or binding in the track as the panel is moved.

The tracks on which the rollers ride are recessed within the side walls of the trailer and therefore, do not interfere with loading and insure that the entire load of the panel is borne on the supporting members within the side wall of the trailer.

The rubber flaps provide an effective seal with the walls of the trailer and by employing two flaps along each edge of the panel, a dead air space is provided between the flaps which further enhances the insulating effect.

Various modes of carrying out the invention are contemplated as being within the scope of the following claims particularly pointing out and distinctly claiming the subject matter which is regarded as the invention.

I claim:

1. In a storage structure, means defining a compartment and including a pair of side walls, a top wall and a bottom wall, a track secured to each side wall, a panel disposed transversely within the compartment and adapted to divided the compartment into a pair of chambers, the edges of the panel being spaced out of contact with the respective walls, a bracket secured to each upper corner of the panel and extending from the corner along the respective side edge and top edge of the panel to reinforce the same, a roller rotatably mounted on each bracket and engaged with the track and adapted to ride thereon to effect longitudinal movement of the panel within the compartment, and a resilient seal disposed around the entire periphery of the panel and disposed in contact with the respective walls to seal the space therebetween, said panel adapted to be pivoted upwardly about the horizontal axis extending through said rollers to thereby provide a single unobstructed chamber in said compartment.

2. The structure of claim 1, and including means for locking the lower portion of the partition to at least one of said walls to prevent longitudinal movement of the partition within the compartment.

3. In a trailer, a body defining a storage compartment and including a pair of side walls, a top wall and a bottom wall, a track secured to each side wall adjacent the top wall and disposed in a substantially horizontal plane, a heat insulating partition disposed transversely within the compartment and adapted to divide the compartment into a pair of chambers, the edges of the partition being spaced out of contact with the respective walls, guide means secured to the partition and engageable with the track for effecting longitudinal movement of the partition within the compartment, means for effecting pivotal movement of the partition about a horizontal axis extending through said guide means, blower means disposed in the partition for circulating air between the chambers, an elongated electrical conductor secured to one of said walls and extending longitudinally of the compartment and connected to a source of electrical energy, an electrical lead wire connected to the blower means and including a terminal clamping member engageable with said conductor to thereby selectively connect said blower means to said source of energy, said clamping member being adapted to be disengaged from said conductor prior to moving said partition and to be re-engaged with the conductor after the partition has been moved, and a resilient seal disposed around the entire periphery of the partition and disposed in contact with the respective walls to seal the space therebetween.

4. In a trailer, a body defining a storage compartment and including a pair of side walls, a top wall and a bottom wall, said side walls having an inner facing member and a central insulating section and said side walls having a substantially horizontal recess spaced from the top wall, a track secured within the recess in each side wall, a heat insulating partition disposed transversely within the compartment and adapted to divide the compartment into a pair of chambers, the edges of the partition being spaced out of contact with the respective walls, wheel means rotatably secured to the partition and engageable with the track for effecting longitudinal movement of the partition within the compartment, a pair of flashing members secured to said top wall and extending downwardly along the respective side walls and into said recess behind said track and extending beneath said track and then downwardly over the facing member to prevent moisture and condensation from passing behind said track and into said central section of said side wall, and a resilient seal disposed around the entire periphery of the partition and disposed in contact with the respective walls to seal the space therebetween.

5. In a storage structure, a body defining a compartment and including a pair of side walls, a top wall and a bottom wall, a track secured to each side wall adjacent the top wall, a partition disposed transversely within the compartment and adapted to divide the compartment into a pair of chambers, a guide support member connected to each side edge of the partition, and a pair of guide members connected in longitudinally spaced relation to each guide support member and disposed to ride on the respective track to permit longitudinal movement of the partition within the compartment.

6. In a storage structure, a body defining a compartment and including a pair of side walls, a top wall and a bottom wall, a guide rail secured to each side wall adjacent the top wall, a partition disposed transversely within the compartment and adapted to divide the compartment into a pair of chambers, the edges of the partition being spaced out of contact with the respective walls, a guide support member connected to each side edge of the partition and having a portion of said guide support member extending longitudinally beyond said partition, a pair of guide members connected in spaced relation to each guide support member and disposed to ride on the respective guide rail to permit longitudinal movement of the partition within the compartment, the guide members of each pair being in spaced longitudinal relation and one guide member of each pair being connected to said portion of the respective guide support member, and a resilient seal disposed around the periphery of the partition and disposed in contact with the respective walls to seal the space therebetween.

7. In a trailer, a body defining a storage compartment and including a pair of side walls, a top wall and a bottom wall, a track secured to each side wall adjacent the top wall and disposed in a substantially horizontal plane, a partition disposed transversely within the compartment and adapted to divide the compartment into a pair of chambers, the edges of the partition being spaced out of contact with the respective walls, a guide support member disposed between the side edges of the partition and the corresponding side walls of said body with a portion of each guide support member extending longitudinally beyond said partition, means for pivotally connecting each guide support member to the side edge of the partition to permit the partition to be tilted wtihin the compartment, a pair of guide members connected in longitudinally spaced relation to each guide support member and disposed to ride on the respective track to permit longitudinal movement of the partition within the compartment, one guide member of each pair being in alignment with said partition and the other guide member of each pair being connected to said portion and spaced longitudinally of said partition, and a resilient seal disposed around the periphery of the partition and disposed in contact with the respective walls to seal the space therebetween.

8. A movable heat insulating panel for a storage structure adapted to divide the structure into a plurality of storage compartments, comprising a lightweight core having a peripheral edge and a pair of opposite faces, an edge member mounted on the peripheral edge of the core and having a web extending along said peripheral edge and having a pair of spaced side flanges extending inwardly of the web along the faces of the core, a pair of facing sheets secured to the flanges of the edge member and covering the respective faces of the core, and a resilient sealing member secured between each side flange of the edge member and the corresponding facing sheet, said sealing members being disposed around the entire periphery of the core and extending outwardly a substantial distance beyond the edge member and adapted to engage the walls of the storage structure, the sealing members disposed along each edge of the core being spaced apart to provide an air space therebetween and thereby increase the thermal sealing effect.

9. A movable heat insulating partition for a storage structure adapted to divide the structure into a plurality of storage compartments, comprising a central cellular core having a peripheral edge and a pair of generally flat opposite faces, a metallic edge member having a channel shaped cross section disposed around said peripheral edge of the core, said edge member having an open side receiving said peripheral edge of said core, a thin metallic facing sheet disposed outwardly of each of the faces of the core and secured to said metallic edge member, and a flexible sealing member disposed between each side of the edge member and the corresponding facing sheet and serving to prevent metal-to-metal contact therebetween, said sealing members being disposed around the entire periphery of the core and extending outwardly a substantial distance beyond the edge member and adapted to engage the wall of the storage structure, the sealing members disposed along each edge of the core being spaced apart to provide an air space therebetween and thereby increase the thermal sealing effect.

10. In a trailer, a body defining a storage compartment including a pair of side walls, a top wall and a bottom wall, a track secured to each side wall adjacent the top wall and disposed in a substantially horizontal plane, a heat insulating partition disposed transversely within the compartment and adapted to divide the compartment into a plurality of chambers, the edges of the partition being spaced out of contact with the respective walls, a support member disposed adjacent each side edge of the partition, guide means carried by the support means and engageable with the track for effecting longitudinal movement of the partition within the compartment, means for pivotally connecting the partition to said support member to enable the partition to be pivoted about a horizontal axis extending through said pivotal means, blower means disposed in the partition for circulating air between the chambers, and a resilient seal disposed around the entire periphery of the partition and disposed in contact with the respective walls to seal the space therebetween.

11. The structure of claim 10 in which one of the walls is corrugated to provide a series of air passages extending between the chambers for the return of the air being circulated by said blower means.

12. In a trailer, a body defining a storage compartment including a pair of side walls, a top wall and a bottom wall, a track recessed within each side wall adjacent the top wall and disposed at a substantially horizontal plane, a heat insulating partition disposed transversely within the compartment and adapted to divide the compartment into a pair of chambers, the edges of the partition being spaced out of contact with the respective walls, said partition including a central lightweight core having a peripheral edge and a pair of opposite faces, a metallic edge member having a channel shaped cross section disposed around the peripheral edge of the core, said edge member having an open side to receive the peripheral edge of the core, a pair of metal facing sheets disposed outwardly of the respective faces and secured to said edge member, a resilient sealing member disposed between each edge member and the corresponding facing sheet and serving to prevent metal-to-metal contact therebetween, said sealing members being disposed around the entire periphery of the core and extending outwardly a substantial distance beyond the edge member and adapted to engage the walls of the storage structure, a generally L-shaped bracket disposed at each upper corner of the partition and secured to said edge member, said bracket disposed between the sealing members, and a guide member mounted on each bracket and engaged with the track and adapted to ride thereon to effect longitudinal movement of the partition within the compartment.

13. In a storage structure, means defining a compartment and including a pair of said walls, a top wall and a bottom wall, a track secured to each side wall, a panel disposed transversely within the compartment and adapted to divide the compartment into a pair of chambers, a bracket secured to each upper corner of the panel, said bracket including a vertical portion extending vertically from the corner along the respective side edge of the panel and said bracket including a horizontal portion extending from the corner along the top edge of the panel, journalling means secured to said vertical portion of the bracket, a shaft journalled within said journalling means, a roller carried by the outer end of the shaft, said roller being engaged with the track and being movable along the track to enable the panel to be moved longitudinally within the compartment.

References Cited in the file of this patent

UNITED STATES PATENTS

| | | |
|---|---|---|
| 2,101,736 | George | Dec. 7, 1937 |
| 2,677,244 | Wehby | May 4, 1954 |
| 2,677,246 | Wehby | May 4, 1954 |
| 2,881,688 | Breen | Apr. 14, 1959 |